(12) United States Patent
Kadjo

(10) Patent No.: US 11,860,143 B2
(45) Date of Patent: Jan. 2, 2024

(54) METHOD AND SYSTEM FOR SELF-REGULATING A SUPPRESSOR

(71) Applicant: DIONEX CORPORATION, Sunnyvale, CA (US)

(72) Inventor: Akinde F. Kadjo, Santa Clara, CA (US)

(73) Assignee: DIONEX CORPORATION, Sunnyvale, CA (US)

( * ) Notice: Subject to any disclaimer, the term of this patent is extended or adjusted under 35 U.S.C. 154(b) by 102 days.

(21) Appl. No.: 17/558,464

(22) Filed: Dec. 21, 2021

(65) Prior Publication Data

US 2023/0194484 A1  Jun. 22, 2023

(51) Int. Cl.
| | |
|---|---|
| *G01N 30/86* | (2006.01) |
| *G01N 30/96* | (2006.01) |
| *G01N 30/02* | (2006.01) |
| *G01N 30/64* | (2006.01) |

(52) U.S. Cl.
CPC ......... *G01N 30/8658* (2013.01); *G01N 30/96* (2013.01); *G01N 30/02* (2013.01); *G01N 30/64* (2013.01); *G01N 2030/027* (2013.01); *G01N 2030/965* (2013.01)

(58) Field of Classification Search
CPC ......... G01N 30/8658; G01N 2030/027; G01N 2030/965; G01N 30/02; G01N 30/64
See application file for complete search history.

(56) References Cited

U.S. PATENT DOCUMENTS

| | | | |
|---|---|---|---|
| 3,897,213 A | 7/1975 | Stevens et al. | |
| 3,920,397 A | 11/1975 | Small et al. | |
| 3,925,019 A | 12/1975 | Small et al. | |
| 3,926,559 A | 12/1975 | Stevens | |
| 3,966,596 A * | 6/1976 | Stevens ............ | B01J 39/26 |
| | | | 210/656 |
| 4,017,262 A * | 4/1977 | Small ............... | B01J 39/26 |
| | | | 210/284 |

(Continued)

FOREIGN PATENT DOCUMENTS

JP       2013195301 A      9/2013

OTHER PUBLICATIONS

Wang et al. "Design and Implementation of Adjustable Voltage Source Module for Ion Chromatography" Journal of Physics: Conference Series, 2002, vol. 2264, 3rd International Conference on Mechanical Instrumentation and Automation, 8 pages.

(Continued)

*Primary Examiner* — David J Bolduc

(57) ABSTRACT

A system for self-regulating a suppressor includes an ion chromatography suppressor, a power supply for applying an electric potential to the suppressor, and a control unit configured to provide an offset voltage $V_{OS}$ and an applied voltage $V_A$ to the suppressor, measure a current of the suppressor responsive to the offset and applied voltages $V_{OS}$ and $V_A$, determine a suppressor state of the suppressor based upon the measured current, and adjust the offset voltage $V_{OS}$ based upon the suppressor state. A method for self-regulating a suppressor is also disclosed.

20 Claims, 6 Drawing Sheets

(56) References Cited

U.S. PATENT DOCUMENTS

| | | | | |
|---|---|---|---|---|
| 4,042,499 | A | * | 8/1977 | Ramstad ................ B01D 15/18 210/659 |
| 4,403,039 | A | | 9/1983 | Ban et al. |
| 4,459,357 | A | | 7/1984 | Jansen et al. |
| 4,474,664 | A | | 10/1984 | Stevens et al. |
| 4,672,322 | A | * | 6/1987 | Gratteau ................ G01N 27/07 324/443 |
| 4,861,555 | A | * | 8/1989 | Mowery, Jr. ........... G01N 30/96 73/61.52 |
| 4,925,567 | A | * | 5/1990 | McAleese ............. G01N 30/96 210/659 |
| 4,999,098 | A | | 3/1991 | Pohl et al. |
| 5,045,204 | A | * | 9/1991 | Dasgupta ........... B01D 19/0031 210/635 |
| 5,140,527 | A | * | 8/1992 | Jones ...................... E21B 21/08 175/42 |
| 5,248,426 | A | | 9/1993 | Stillian et al. |
| 5,597,734 | A | | 1/1997 | Small et al. |
| 5,759,405 | A | * | 6/1998 | Anderson, Jr. ...... G01N 27/453 73/61.52 |
| 6,093,327 | A | * | 7/2000 | Anderson, Jr. ........ G01N 30/52 210/198.2 |
| 6,328,885 | B1 | | 12/2001 | Srinivasan et al. |
| 7,741,019 | B2 | * | 6/2010 | Diamandis ....... G01N 33/57449 435/7.23 |
| 8,293,099 | B2 | | 10/2012 | Dasgupta et al. |
| 10,416,137 | B2 | | 9/2019 | Dasgupta et al. |
| 10,699,867 | B2 | * | 6/2020 | Lanio ...................... H01J 37/06 |
| 11,105,782 | B2 | | 8/2021 | Srinivasan et al. |
| 2001/0019031 | A1 | | 9/2001 | Anderson et al. |
| 2004/0115745 | A1 | * | 6/2004 | Diamandis ....... G01N 33/57449 435/7.23 |
| 2006/0159616 | A1 | * | 7/2006 | Yousef ............. G01N 33/57484 424/9.6 |
| 2007/0065343 | A1 | * | 3/2007 | Srinivasan ........... G01N 30/463 422/70 |
| 2007/0163663 | A1 | * | 7/2007 | Strand ................ F16K 99/0042 137/806 |
| 2009/0218238 | A1 | * | 9/2009 | Dasgupta ............... G01N 30/96 205/789 |
| 2014/0134050 | A1 | * | 5/2014 | Srinivasan ............. G01N 30/96 422/70 |
| 2015/0157976 | A1 | * | 6/2015 | Srinivasan ................ C25B 1/04 204/263 |
| 2016/0187305 | A1 | * | 6/2016 | Srinivasan ............... B01J 47/04 210/85 |
| 2017/0322188 | A1 | * | 11/2017 | Dasgupta ............... G01N 30/34 |
| 2018/0065089 | A1 | * | 3/2018 | Dasgupta ............. B01D 15/361 |
| 2018/0149629 | A1 | * | 5/2018 | Dasgupta ............... G01N 30/30 |
| 2018/0164262 | A1 | * | 6/2018 | Zhang .................... G01N 30/64 |
| 2019/0324373 | A1 | * | 10/2019 | Kamimura ........... H01L 21/027 |
| 2019/0369066 | A1 | * | 12/2019 | Sawata .................. G01N 30/64 |
| 2020/0132639 | A1 | * | 4/2020 | Sakamoto ............. B01D 15/08 |
| 2020/0147518 | A1 | * | 5/2020 | Sakamoto ............. B01D 15/08 |
| 2021/0318328 | A1 | * | 10/2021 | Gao .................... G01N 33/574 |
| 2022/0155265 | A1 | * | 5/2022 | Sakamoto ........... B01D 15/426 |
| 2022/0187254 | A1 | * | 6/2022 | Sakamoto ............. G01N 30/02 |
| 2022/0244223 | A1 | * | 8/2022 | Iijima .................... G01N 30/62 |
| 2022/0244225 | A1 | * | 8/2022 | Iijima .................... G01N 30/26 |
| 2023/0028078 | A1 | * | 1/2023 | Tanaka .................. B01D 61/46 |

OTHER PUBLICATIONS

Naama Karu, "Suppressed Ion Chromatography of Organic Acids with Universal Detection" Thesis submitted for Doctor of Philosophy, University of Tasmania, School of Chemistry, May 2012, 104 pages.

Zhao et al. "A bipolar membrane-based cation electrolytic membrane suppresor for ion chromatography" Journal of Chromatography A, Oct. 2019, vol. 1603, pp. 422-425.

* cited by examiner

METHOD AND SYSTEM FOR SELF-REGULATING A SUPPRESSOR

BACKGROUND OF INVENTION

Field of Invention

This application relates, in general, to separating ionic species in ion chromatography, and more particularly to methods and systems for self-regulating a suppressor during ion chromatography.

Description of Related Art

Ion chromatography is widely used in the analysis of samples containing anions or cations. And suppressors play an instrumental role in ion chromatography by allowing analytes to be detectable.

A typical ion chromatography process begins with introducing a sample into a solution of conductive eluent, then chromatographically separating sample ions in the eluent, suppressing the eluent to remove eluent ions counter to sample ions, and detecting the sample ions. The purpose of suppression is to reduce the background conductivity of the eluent and increase the conductivity of the sample analytes, thus promoting subsequent conductive detection of the sample analytes.

Suppressors are utilized to suppress eluent. Suppressors generally include an eluent channel and a regenerant channel, which are separated by an ion-exchange membrane. The membrane allows ions to pass between the channels while blocking liquid flow between channels. An electric potential is be applied to the suppressor that causes ions of a particular charge to pass through the membrane from eluent flowing through the eluent channel to regenerant flowing through the regenerant channel. Thus, background conductivity and noise of the analysis stream are reduced while enhancing the conductivity of the analytes effectively increasing the signal/noise ratio.

Currently, a user must determine the voltage and/or current settings of a suppressor based upon various parameters. Such parameters include the electrolytic properties of a given eluent as well as the concentration of the eluent flowing through the suppressor and its flow rate. And in existing systems, suppressors generally require currents higher than theoretically predicted for achieving quantitative suppression, especially when gradients of varying concentration are utilized. For example, current systems provide users with a range of currents to be applied to the suppressor, and the users are often encouraged to increase the current if a lower range does not sufficiently suppress the eluent. Unfortunately, higher currents generally translate into heat generation and higher background noise, especially under high eluent concentration conditions.

In light of the foregoing, it would be beneficial to have methods and systems that overcome the above and other disadvantages of known suppressors and ion chromatography systems.

BRIEF SUMMARY

One aspect of the present invention is directed to a method for self-regulating a suppressor of an ion chromatography system. The method may include: setting a power supply to provide an offset voltage $V_{OS}$ to the suppressor; activating the power supply to provide an applied voltage waveform $V_A$ to the suppressor in addition to the offset voltage $V_{OS}$; commencing an ion chromatography run on the ion chromatography system in which an eluent flows through the suppressor; measuring a current of the suppressor responsive to the offset and applied voltages $V_{OS}$ and $V_A$ during the ion chromatography run; determining a suppressor state of the suppressor based upon the measured current in response to the offset voltage; and/or adjusting the offset voltage $V_{OS}$ based upon the suppressor state, wherein (a) offset voltage $V_{OS}$ is increased for an unsuppressed state, and (b) offset voltage $V_{OS}$ is maintained for a suppressed state.

Another aspect of the present invention is directed to a system for self-regulating the separation of ionic species in a liquid sample. The system may include: an ion chromatography suppressor including a liquid-sample channel, an ion-receiving channel, and an ion-exchange membrane configured to substantially block bulk liquid flow between the liquid-sample and ion-receiving channels while allowing passage of ions of one charge, positive or negative, between the channels; first and second electrodes in electrical communication with the liquid-sample and ion-receiving channels, respectively; a power supply for applying an electric potential to the suppressor via the first and second electrodes; and/or a control unit including one or more processors and memory. The one or more processors run software configured to perform the following steps: setting the power supply to provide an offset voltage $V_{OS}$ to the suppressor; activating the power supply to provide an applied voltage $V_A$ to the suppressor in addition to the offset voltage $V_{OS}$; commencing an ion chromatography run in which an eluent flows through the suppressor; measuring a current of the suppressor responsive to the offset and applied voltages $V_{OS}$ and $V_A$ during the ion chromatography run; determining a suppressor state of the suppressor based upon the measured current in response to the offset voltage; and/or adjusting the offset voltage $V_{OS}$ based upon the suppressor state, wherein (a) offset voltage $V_{OS}$ is increased for an unsuppressed state, and (b) offset voltage $V_{OS}$ is maintained for a suppressed state.

And a further aspect of the present invention is directed to a device for self-regulating the separation of ionic species in a liquid sample. The device may include: a power supply configured to apply an electric potential to an ion chromatography suppressor, the suppressor including a liquid-sample channel, an ion-receiving channel, and an ion-exchange membrane configured to substantially block bulk liquid flow between the liquid-sample and ion-receiving channels while allowing passage of ions of one charge, positive or negative, between the channels; and/or a control unit including one or more processors and memory. The one or more processors run software configured to perform the following steps: setting the power supply to provide an offset voltage $V_{OS}$ to the suppressor; activating the power supply to provide an applied voltage waveform $V_A$ to the suppressor in addition to the offset voltage $V_{OS}$; commencing an ion chromatography run in which an eluent flows through the suppressor; measuring a current of the suppressor responsive to the offset and applied voltages $V_{OS}$ and $V_A$ during the ion chromatography run; determining a suppressor state of the suppressor based upon the measured current in response to the offset voltage; and/or adjusting the offset voltage $V_{OS}$ based upon the suppressor state, wherein (a) offset voltage $V_{OS}$ is increased for an unsuppressed state, and (b) offset voltage $V_{OS}$ is maintained for a suppressed state.

Embodiments of the invention may include one or more of the following features.

A concentration of the eluent may be varied with time as the eluent flows through the suppressor, and wherein the adjusting step may vary the offset voltage $V_{OS}$ over time in response to the varied concentration of the eluent with time.

Diminishing upper current may indicate electrical capacitance and resistance within the suppressor, and substantially constant current may indicate substantially constant electrical resistance within the suppressor.

The determining step may be also based upon the measured current in response to the offset voltage, wherein increasing upper current indicates an over-suppressed state. The adjusting step may be also based on the suppressor state wherein offset voltage $V_{OS}$ is decreased for an over-suppressed state.

The oscillating voltage may have a voltage amplitude A and a voltage frequency F, and the applied voltage $V_A$ may be a square-waveform voltage having a positive pulse width and a negative pulse width. A current slope ($S_P$) of the positive pulse width less than a first predetermined threshold may indicate an unsuppressed state. A substantially neutral current slope ($S_P$) of the positive pulse width greater than the first predetermined threshold and less than a second predetermined threshold may indicate a suppressed state. A current slope ($S_P$) of the positive pulse width greater than the second predetermined threshold may indicate an over-suppressed state.

The applied voltage $V_A$ may be a square waveform voltage having a positive pulse width and a negative pulse width, wherein the positive pulse width has a slope $S_P$. A slope $S_P$ of less than 0.1 mA/s may indicate an unsuppressed state, a slope $S_P$ of mA/s to 0.3 mA/s may indicate a suppressed state, and a slope $S_P$ greater than mA/s may indicate an over-suppressed state.

The applied voltage $V_A$ may be a square waveform voltage having a positive pulse width and a negative pulse width, wherein the negative pulse width has a slope $S_N$. A slope $S_N$ greater than −0.05 mA/s may indicate an unsuppressed state, and a slope $S_N$ less than −0.05 may indicate a suppressed or over-suppressed state.

The applied voltage $V_A$ may be an oscillating voltage having period T, wherein the measuring, determining, and adjusting steps are performed for each period T.

The adjusting step may adjust the offset voltage $V_{OS}$ by an adjusted voltage $\Delta V$ each period T. The adjusted voltage $\Delta V$ may be less than the applied voltage $V_A$. The adjusted voltage $\Delta V$ may be less than 10% of the applied voltage $V_A$. The adjusted voltage $\Delta V$ may be 5 mV.

Increasing upper current may indicate increased electrical resistance and thermal effects within the suppressor. And (a) a diminishing upper current may indicate an unsuppressed state of the eluent flowing through the suppressor, and (b) a substantially constant upper current may indicate a suppressed state The system may further include a chromatography column upstream from the suppressor and a conductivity detector downstream from the suppressor.

The power supply may be a dedicated power supply providing the electric potential to the suppressor. The system may further include a power-supply module that includes the power supply and the control unit. The power supply may be a dedicated power supply providing the electric potential only to the suppressor.

The methods and systems of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
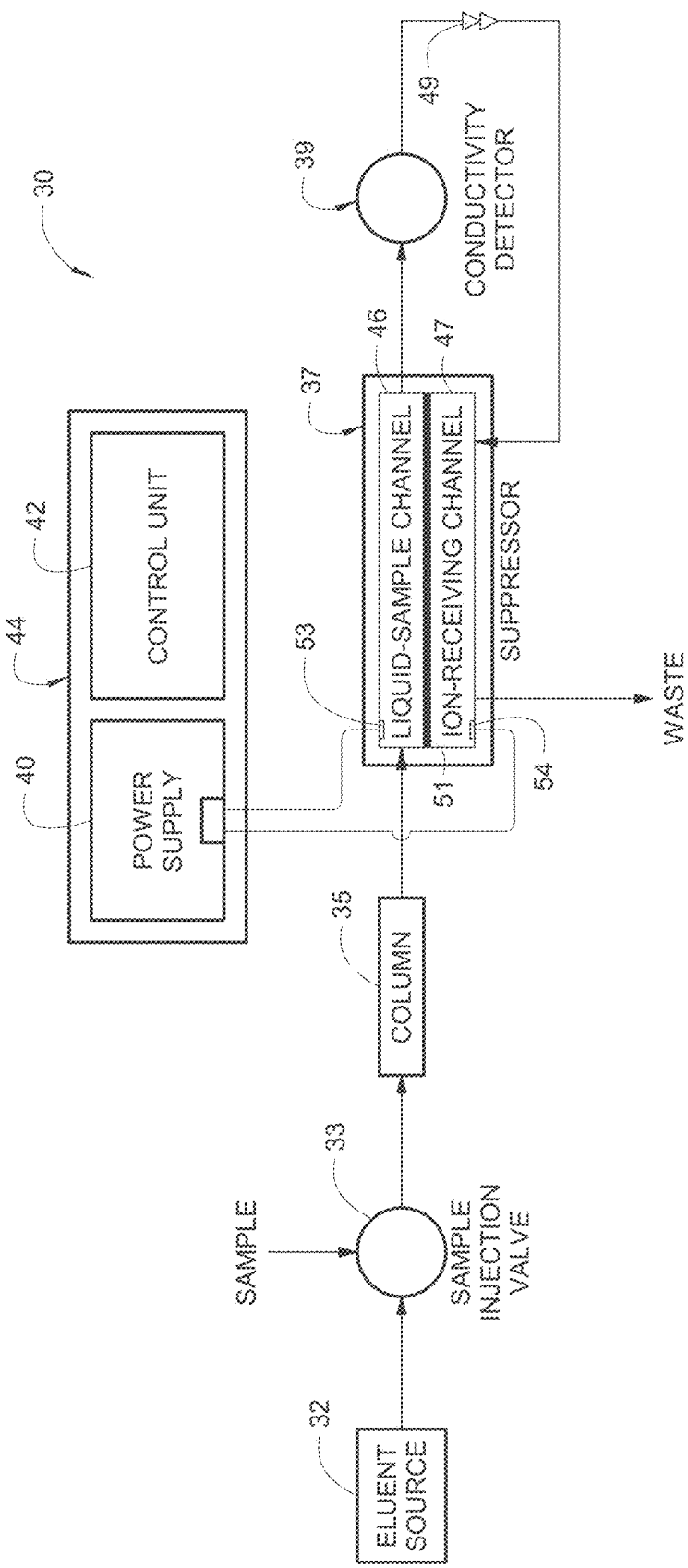
FIG. 1 is a schematic view of an exemplary system for self-regulating an ion-chromatography suppressor in accordance with various aspects of the present invention.

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents, and other embodiments, which may be included within the spirit and scope of the invention(s) as defined by the appended claims.

Chromatography is a separation technique where analytes within a sample mixture are separated while going through a chromatography column based on the analytes' distinct affinity for a stationary phase versus a mobile phase. In ion chromatography (IC), the separation is specific to ions. Following separation, analytes may be detected by conductivity detectors due to the electrical properties of ions. This inherently presents a challenge as the separated analytes are enveloped by a sea of eluent, which eluent is also conductive, whereby conductive detection of the eluting analyte can be impossible. This challenge may be resolved by utilizing a suppressor between the separation column and the conductivity detector that removes background conductivity of the eluent by turning the eluent into water, which effectively enhances the signal of the analyte.

The mechanisms are slightly different for anion and cation analyses. In the case of an Anion suppressor, sodium or potassium ions are respectively removed from the eluent flowing through the suppressor of sodium hydroxide or potassium hydroxide and the remaining hydroxide ions combine with hydronium ions to form water, which has a very low conductivity and thus lowers the background signal of the eluent. The counter cations of the analytes are replaced with hydronium, thus changing the analytes from a salt form to an acid form therefore enhancing their signals. In the case of a Cation suppressor, metasulfunate and sulfunate are respectively removed from the eluent flowing through the suppressor of metasulfonic acid and sulfuric acid and the remaining hydronium ions combine with hydroxide ions to form water, which again lowers the background signal of the eluent. Similarly, the counter anions of the analytes are replaced with hydroxide, thus transforming the analytes from a salt form to their base form therefore enhancing their signals.

Over time, suppressors have evolved from single column devices that needed several regeneration cycles (such as those described in U.S. Pat. Nos. 3,897,213, 3,920,397, 3,925,019, 3,926,559, and 5,597,734), to continuously regenerated in-line devices (such as those described in U.S. Pat. No. 4,474,664), to more recent electrolytically regenerating devices (such as those shown in U.S. Pat. Nos. 4,459,357, 4,403,039, 4,999,098 and 5,248,426), the entire content of which patents is incorporated herein for all purposes by this reference.

Generally, a voltage is applied to a suppressor to effect an ion exchange between eluent and regenerant channels. The amount of voltage needed to sufficiently suppress the eluent is generally dependent on the eluent flow rate and concentration.

In accordance with various aspects of the present invention, the methods and systems herein allow for self-regulation of suppressors by determining the state of the suppressor to distinguish whether there is insufficient current, optimal current, or too much current being provided to the suppressor. The state of the suppressor may be determined based upon the impedance of the suppressor, in which capacitance may indicate an unsuppressed state, resistance may indicate a suppressed state, and resistance with thermal effects may indicate an over-suppressed state.

Turning now to the drawings, wherein like components are designated by like reference numerals throughout the various figures, attention is directed to FIG. 1 which illustrates an exemplary chromatography (IC) system 30 in accordance with various aspects of the present invention. The IC system generally includes an eluent source 32, a sample injection valve 33, an ion-chromatography column 35, a suppressor 37, and a conductivity detector 39. In accordance with various aspects of the present invention, the system also includes a power supply 40 and a control unit 42, which are configured to monitor and adjust the voltage applied to the suppressor in order to improve or optimize the performance of the suppressor. The control unit generally includes one or more processors and memory, with the processor(s) being configured to run software for performing various steps.

The power supply may be a dedicated power supply providing the electric potential to the suppressor, which configuration may be particularly well suited for retrofitting existing IC systems. The power supply and the control unit may be discrete components, or they may be integrated into a power-supply module 44 that may be integrally provided in a new IC system or separately provided to retrofit an existing IC system.

Generally, a sample is introduced into an eluent through sample injection valve 33 and the resulting solution flows to and through column 35, which is packed with a chromatographic separation medium to separate analytes within the sample from one another. The solution leaving column 35 is directed downstream to suppressor 37, which suppresses the conductivity of the eluent but not the ionic conductivity of the separated analytes.

Typically, suppressor 37 includes a primary eluent or liquid-sample channel 46 through which sample containing an ionic species flows, and a regenerant or ion-receiving channel 47 through which a regenerant flows. One will appreciate that such suppressors are particularly well suited for IC suppression, however, such suppressors may be used for sample pre-treatment and other uses. As such, the primary channel may suppress an eluent with an ionic species, or alternatively, may simply pretreat a liquid including an ionic species.

The suppressed eluent is then directed downstream to a detection means such as a conductivity detector 39 for detecting the resolved ionic species. In the conductivity detector, the presence of ionic species produces an electrical signal proportional to the amount of ionic material, thus permitting detection of the concentration of separated ionic species. The conductivity detector may be operably connected to a computer, processing device, data acquisition system, or other suitable means for acquiring and/or processing the data.

After passing through conductivity detector 39, the eluent may be directed to ion-receiving channel 47 of suppressor 37, thus providing a source of water to the suppressor 37, in manner similar to that described in U.S. Pat. No. 5,352,360, the entire content of which is incorporated herein for all purposes by this reference. The suppressed eluent may then be directed to waste.

To prevent eluent in conductivity detector 39 from outgassing, the system may include a back pressure coil 49 downstream from the conductivity detector through which eluent flows before flowing to the ion-receiving channel of the suppressor. The back pressure coil may help prevent gases generated during suppression, from out-gassing and thus prevent the formation of bubbles in the conductivity detector, thus reducing noise and improving accuracy of the detector.

As noted above, the suppressor includes liquid-sample channel 46 through which sample flows containing an ionic species, and ion-receiving channel 47 through which a regenerant flows. An ion-exchange membrane 51 between the channels and is configured to substantially block bulk liquid flow between the liquid-sample and ion-receiving channels while allowing passage of ions of one charge, positive or negative, between the channels.

The suppressor is provided with a first electrode 53 in electrical communication with liquid-sample channel 46, and a second electrode 54 in electrical communication ion-receiving channel 47. The electrodes may be in the form of flat plates or other structure that can be mounted or embedded in the respective channels. The electrodes may be formed of highly conductive materials that are inert to the solutions passed through the suppressor. Platinum is a preferred material for this purpose, however, one will appreciate that other suitable materials may be utilized. An electrical potential is applied between the electrodes from the power supply.

Power supply 40 is configured to apply an electric potential to suppressor 37 via first and second electrodes 53, 54. An external power supply may be utilized, such as a N6774A power supply in conjunction with an N6705C power analyzer, both by Keysight Technologies of Colorado Springs, CO. One will appreciate that other suitable power supply devices may be utilized, either incorporated within one or more components of system 30, or provided externally to the system.

The power supply is configured to provide an operating or offset voltage $V_{OS}$ to the suppressor. The power supply is also configured to provide an applied voltage waveform $V_A$ to the suppressor in addition to the offset voltage $V_{OS}$, the purpose of which will become apparent as described below.

In various embodiments, the power-supply module and/or control unit may utilize engineering software for measurement, hardware control and data insights. A suitable engineering software is the LabVIEW system engineering software by National Instruments of Austin, TX. One will appreciate that such software may be provided with a standalone computing device, incorporated into firmware of the power-supply module and/or control unit, or incorporated into other firmware or software of the IC system. One will appreciate that a wide variety of power supplies and control units may be utilized in accordance with various aspects of the present invention.

In order to determine the state of the suppressor, characteristics are identified to distinguish the suppressor in its three main phases: (1) unsuppressed; (2) suppressed; and (3) over-suppressed. Unfortunately, these states are difficult to assess using a conductivity detector because conductivity signals are high in the unsuppressed state, often resulting in negative peaks in the presence of analyte. Conductivity signals are generally acceptable in the suppressed state (e.g., often near or less than 1.0 μS/cm) with positive peaks identifying analyte. And conductivity signals in the over-suppressed state are not easily distinguishable from those of the suppressed state, namely because conductivity signals in the over-suppressed state are higher than but generally within the same magnitude as those of the suppressed state, with similarly positive peaks.

Accordingly, the systems and methods described herein do not rely on conductivity signals. Instead, and in accordance with various aspects of the present invention, the systems and methods described herein rely on a measured current signal of the suppressor itself. And the measured current signal of the suppressor may be used to distinguish the primary operational states of the suppressor based on the impedance of the suppressor.

Voltage and current within a system are generally related by impedance, in accordance with Ohm's law:

$$V = Z*I \qquad \text{Eq. (1)}$$

where V is voltage, Z is impedance, and I is current. Impedance is the obstruction to a current at a given applied voltage. And the three forms of impedance are resistance, capacitance, and inductance. In the case of pure resistance, the voltage signal and the current signal are in phase and generally proportional to one another. In the case of capacitance, the voltage signal lags the current signal. And in inductance, the voltage signal leads the current signal.

Figure 3:
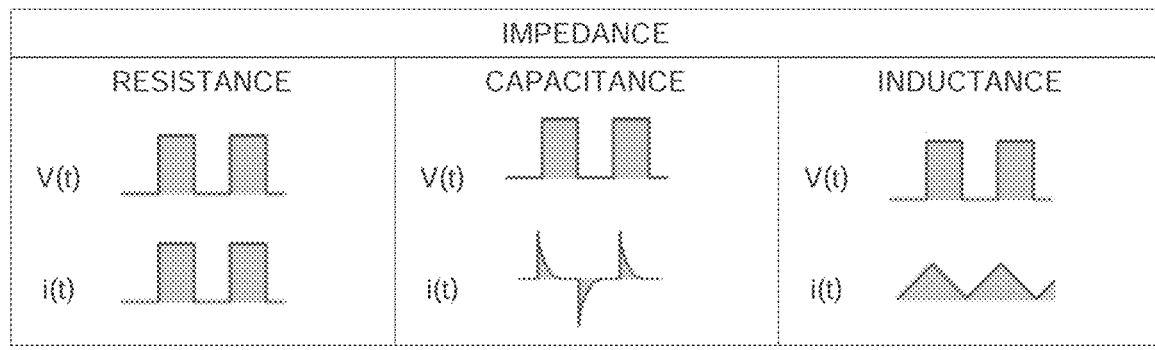
FIG. 3 illustrates an exemplary correlation between voltage and current signals during three forms of impedance, namely during resistance, capacitance, and inductance.

One way to illustrate such impedance is by applying a square voltage signal and observing the response of the current signal. For example, FIG. 3 illustrates various forms of impedance. The resistance form of impedance has a square current signal i(t) that closely resembles the input square voltage signal V(t)—both the voltage and current waveforms are in phase and proportional. The capacitance form of impedance has a square current signal i(t) that is lagging as compared to the input square voltage signal V(t)—here the current signal is the derivative of the voltage signal. And the inductance form of impedance has a current signal i(t) that is leading as compared to the input square voltage signal V(t)—here the current signal is the integral of the voltage signal.

Figure 4:
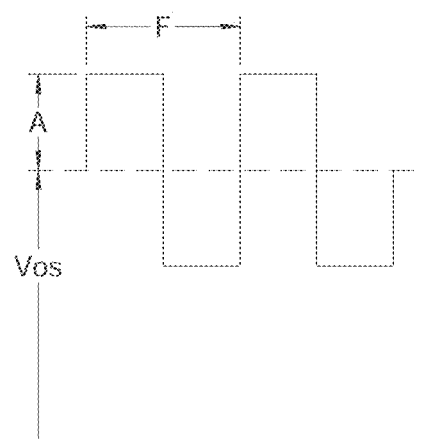
FIG. 4 illustrates an exemplary voltage waveform applied to a suppressor in accordance with various aspects of the present invention.

Thus, when an offset voltage $V_{OS}$ is applied to the suppressor to operate the suppressor, a relatively small applied voltage waveform $V_A$ may be applied to the suppressor in addition to the offset voltage $V_{OS}$ in order to monitor suppressor's current responses to the applied voltage. When the applied voltage waveform $V_A$ is applied in an oscillating square waveform having a frequency F and amplitude A, the combined offset and applied voltage waveform may be represented as shown in FIG. 4. And when the current of the suppressor is measured, the measured current response resulting from the offset and applied voltages provides an indication as to the impedance and corresponding operational state of the suppressor.

Figure 5:
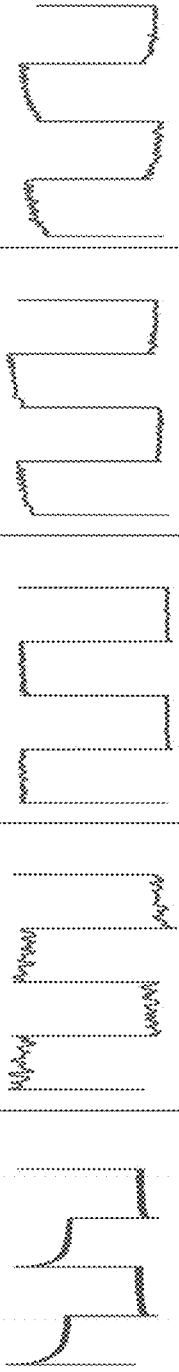
FIG. 5 illustrates an exemplary assessment of suppressor impedance in accordance with various aspects of the present invention.

As shown in FIG. 5, when the suppressor is not suppressed it is highly capacitive, and the measured current response exhibits a diminishing waveform, as shown in the leftmost measured current response. As capacitance decreases when the suppressor approaches suppression, the measured current response exhibits a less diminishing waveform, as shown in the second-from-left measured current response.

When the suppressor is properly suppressed, the resulting waveform is substantially a square waveform. As shown in FIG. 5, the middle measured current response largely approximates the applied voltage waveform shown in FIG. 4. In the suppressed state the impedance is overwhelmingly driven by resistance due to the fact that the eluent is mainly water. Thus, the measured current response is substantially in phase and proportional to the applied voltage waveform shown in FIG. 4.

In the over-suppressed state, there may be additional thermal effects as excessive voltage that may cause higher current through the suppressor. Since there is more than enough current for the suppression process, the excess current may be translated into heat which is reflected in the upward motion of the observed measured current signal. It can be seen in the second-from-right measured current response that the waveform is increasing slightly, and the rightmost measured current response is increasingly increasing.

With an exemplary system described above, an exemplary method for self-regulating a suppressor of an IC system in accordance with various aspects of the present invention can now be described.

Figure 2:
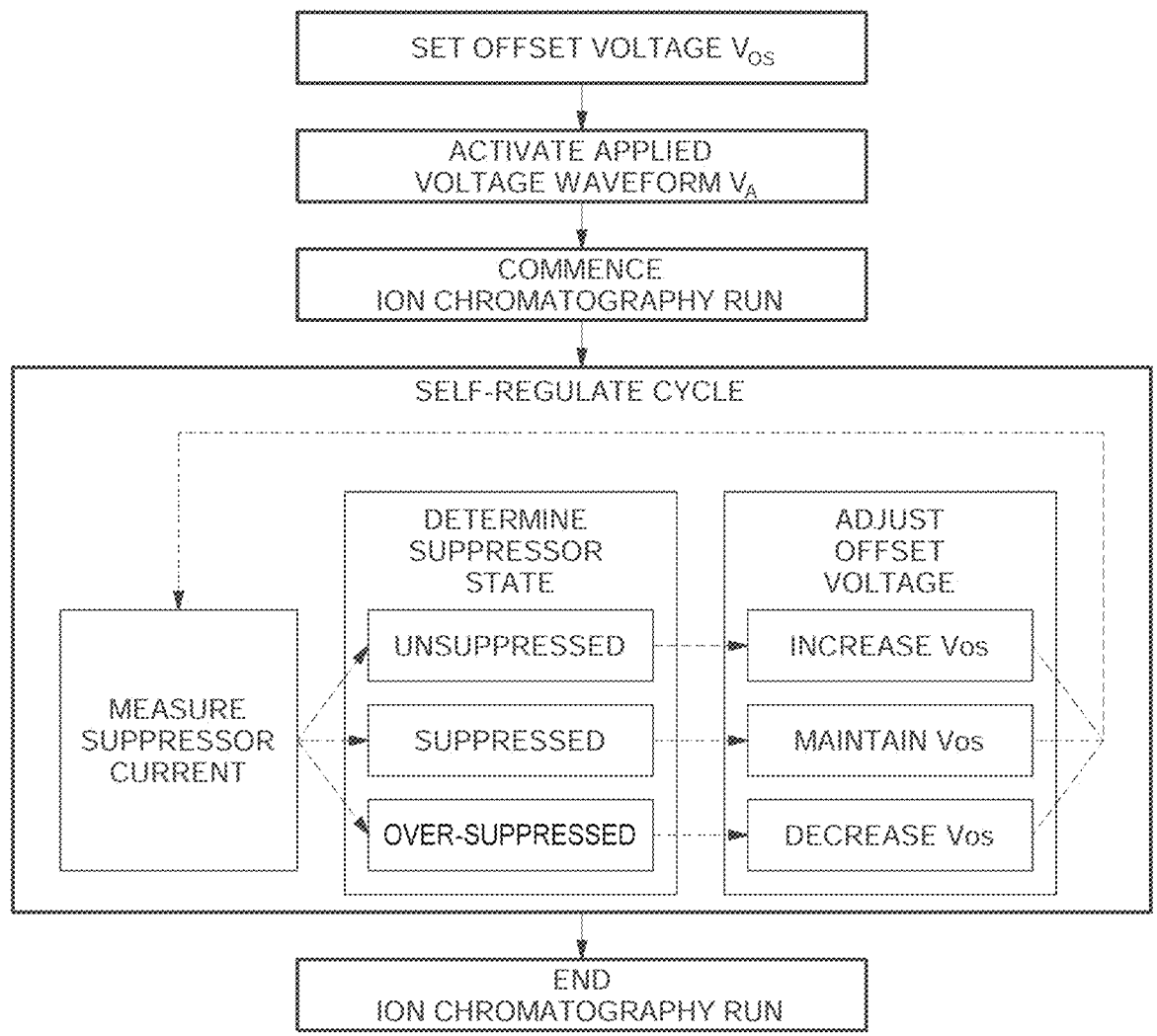
FIG. 2 is a block diagram illustrating an exemplary method for self-regulating an ion-chromatography suppressor in accordance with various aspects of the present invention.

With reference to FIG. 2, the power supply may be set to provide an oscillating offset voltage $V_{OS}$ to the suppressor. And the power supply may be activated to provide an applied voltage waveform $V_A$ to the suppressor in addition to the offset voltage $V_{OS}$. An ion chromatography run may then be commenced on the IC system in which eluent flows through the suppressor.

During the ion chromatography run, a current of the suppressor is cyclically measured responsive to the offset and applied voltages $V_{OS}$ and $V_A$, and a suppressor state of the suppressor is determined based upon the measured current waveform. Diminishing current corresponding to the upper voltage square waveform may indicate an unsuppressed state of the eluent flowing through the suppressor, which may be due to electrical capacitance and resistance within the suppressor. Substantially constant current may indicate a suppressed state, which may be due to substantially constant electrical resistance within the suppressor. And increasing current corresponding to the upper voltage square waveform may indicate an over-suppressed state, which may be due to increased electrical resistance and thermal effects within the suppressor.

The offset voltage $V_{OS}$ supplied to the suppressor may be adjusted based upon the suppressor state. Offset voltage $V_{OS}$ may be increased for an unsuppressed state. Offset voltage $V_{OS}$ may be maintained for a suppressed state. And offset voltage $V_{OS}$ may be decreased for an over-suppressed state. Such adjustments may vary the offset voltage $V_{OS}$ over time in response to varied concentration of eluent flowing through the suppressor over time.

The voltage waveform may have a voltage amplitude A and a voltage frequency F, and the applied voltage waveform $V_A$ may be a waveform voltage having a positive pulse width and a negative pulse width. In various embodiments, an applied square-waveform voltage is utilized to provide readily identifiable positive and negative pulse widths, from which the resulting current response signals would provide readily identifiable current slopes. A current slope of a positive pulse width ($S_P$) less than a first predetermined threshold may indicate an unsuppressed state, a substantially neutral current slope of the positive pulse width ($S_P$) greater than the first predetermined threshold and less than a second predetermined threshold may indicate a suppressed state, and a current slope of the positive pulse width ($S_P$) greater than the second predetermined threshold may indicate an over-suppressed state.

The applied voltage $V_A$ may have a square waveform voltage having a positive pulse width and a negative pulse width. The applied voltage $V_A$ may be an oscillating voltage having period T, wherein the measuring, determining, and adjusting steps are performed for each period T. The measured current response has a positive pulse width slope $S_P$ (e.g., slope $S_P$ in FIG. 7) and a negative pulse width slope $S_N$ (e.g., slope S N in FIG. 7). In accordance with various aspects of the present invention, (a) a slope $S_P$ of less than approximately 0.1 mA/s indicates an unsuppressed state, (b) a slope $S_P$ of approximately 0.1 mA/s to 0.3 mA/s indicates a suppressed state, and (c) a slope $S_P$ greater than approximately 0.3 mA/s indicates an over-suppressed state. And (a) a slope $S_N$ greater than approximately −0.05 mA/s indicates an unsuppressed state, and (b) a slope $S_N$ less than approximately −0.05 indicates a suppressed or over-suppressed state.

An adjusting step may adjust the offset voltage $V_{OS}$ by an adjusted voltage $\Delta V$ each period T. In various embodiments, the adjusted voltage $\Delta V$ is less than the applied voltage $V_A$. And in some embodiments the adjusted voltage $\Delta V$ is less than 10% of the Amplitude A. For example, the adjusted voltage $\Delta V$ may be approximately mV. One will appreciate that a $\Delta V$ of approximately 0.01 to 10% of the Amplitude A may efficiently adjust the voltage while avoiding overcorrection.

In various embodiments, the power supply and control unit may be configured in various ways to apply offset voltages $V_{OS}$ and applied voltage waveforms $V_A$ to the suppressor, and to measure the current of the suppressor response to the offset and applied voltages $V_{OS}$, $V_A$.

Figure 6:
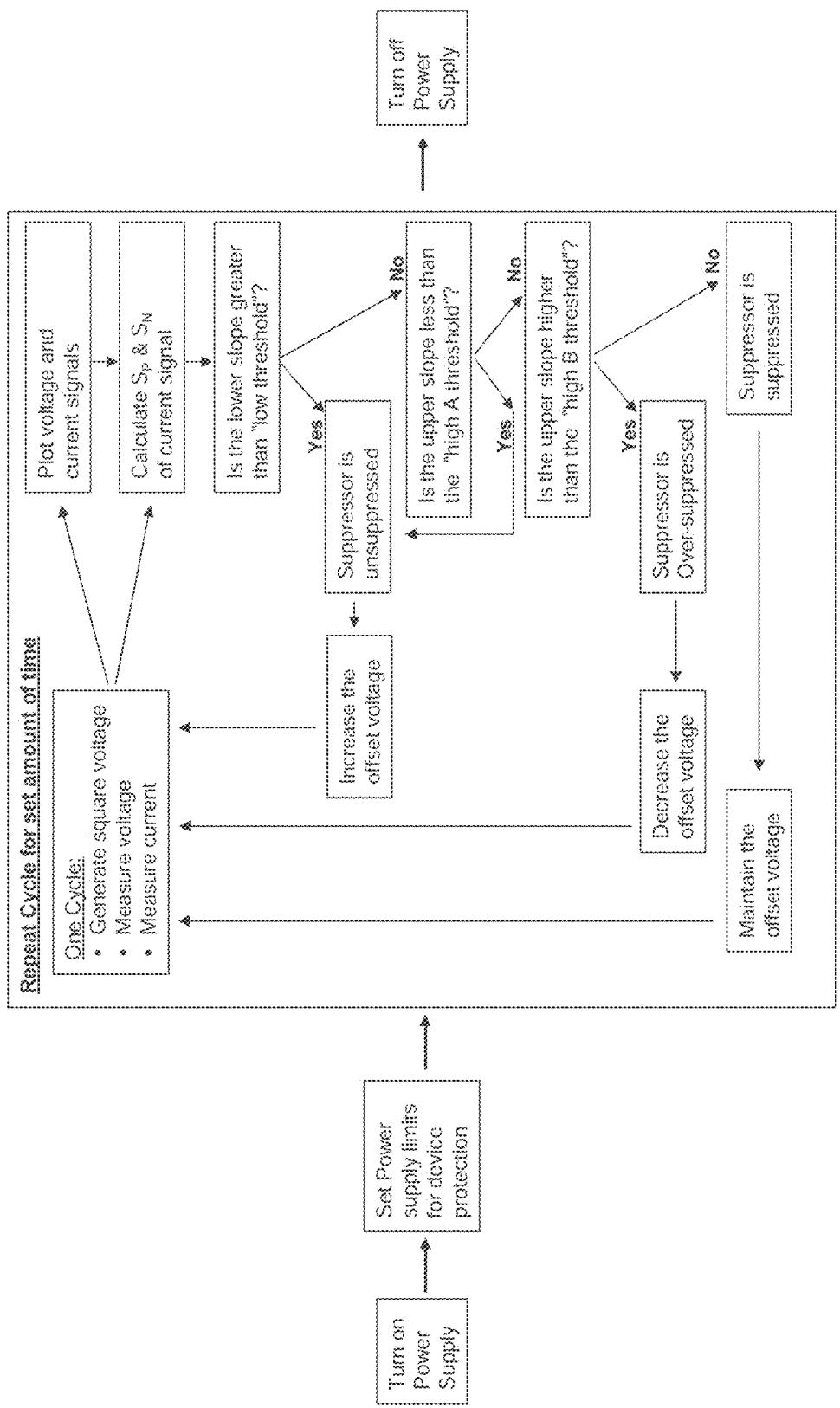
FIG. 6 is a block diagram illustrating another exemplary method for self-regulating an ion-chromatography suppressor in accordance with various aspects of the present invention.

For example, the power supply and control unit may be configured to execute a repeat-cycle program similar to that illustrated in FIG. 6. Such a program allows the self-adjustment of the offset voltage provided to the suppressor based on the current response of the suppressor, thereby creating a self-regulating feedback loop. The program may generally run as follows:

A) The power supply is turned on and parameters are set;
B) A voltage frequency and cycle time are set (e.g., 0.1 Hz with a cycle time of 10 seconds) allowing a single square wave within that cycle (e.g., an upper part of the resulting current wave occurs in the first 5 seconds and the lower part occurs in the last 5 seconds);
C) After each cycle, the upper slope (or $S_p$) of the current wave is calculated using the current and time information from 0.01 seconds to 4.99 seconds, and the same is done for the lower slope (or S N) from 5.01 seconds to 9.99 seconds (e.g., in mA/s), wherein the slope may be calculated by fitting the data to the best linear function with the least error and extracting the slope value of that linear function;
D) After each cycle, the offset voltage $V_{OS}$ is increased or decreased based on the slope values, wherein preset threshold values for the upper (or $S_p$) and lower slopes (or $S_N$) are set to increase or decrease the offset voltage accordingly.

The above is but one example of how the power supply and control unit may be configured to operate the suppressor. One will appreciate that various protocols and parameters may be utilized to apply predetermined operating voltages (i.e., offset voltage $V_{OS}$) and observable applied voltage waveforms (i.e., applied voltage $V_A$) to the suppressor and measure the resulting current of the suppressor in order to self-regulate the suppressor. For example, either the upper or the lower slope (e.g., slopes $S_P$ and $S_N$ in FIG. 7) could be used individually or together to assess operational states of the suppressor.

In one exemplary experimental method in accordance with various aspects of the present invention, the following parameters were used for applying a square waveform voltage to a Dionex™ AERS™ 500 4 mm suppressor: cycle time of 10 seconds; frequency of 0.1 Hz; amplitude of 100 mV; and a delta voltage $\Delta V$ of +/−5 mV (i.e., the amount by which the offset voltage is changed each cycle time every 10 seconds). The current response is shown in FIG. 7, and it can be seen that diminishing measured current response signals indicate unsuppressed states of the suppressor, negligible slopes indicate suppressed states, and increasing wave signals indicate over-suppressed states.

Based upon such behavior, upper and lower slope criteria of the measured current response signals may be defined to distinguish each suppressor state. For example, the following table sets forth slope criteria that may be utilized to distinguish each suppressor state.

| | Slope (mA/s) Criteria | |
|---|---|---|
| | Upper (or $S_P$) | Lower (or $S_N$) |
| Unsuppressed | <0.100 | >−0.050 |
| Suppressed | 0.100-0.300 | <−0.050 |
| Over-Suppressed | >0.300 | <−0.050 |

Figure 7:
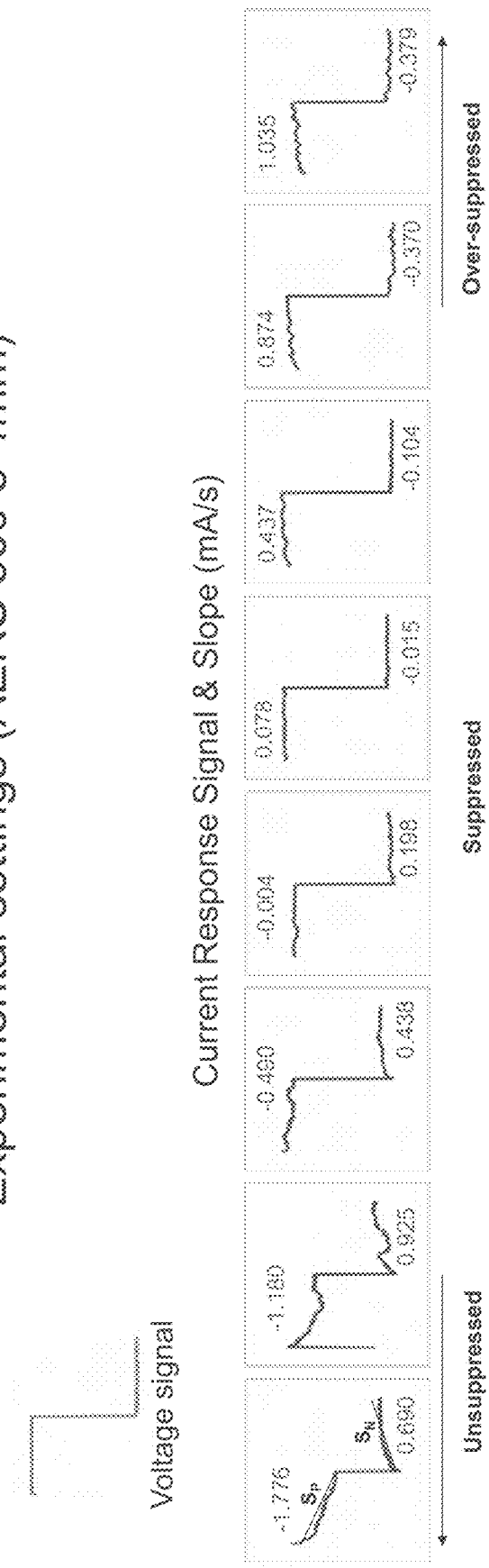
FIG. 7 illustrates an exemplary current response of a suppressor in response to a voltage signal applied to the suppressor in accordance with various aspects of the present invention

With reference to FIG. 7, the unsuppressed state may be identified when the upper slope (e.g., $S_P$ in FIG. 7) is below approximately 0.100 mA/s, the suppressed state when the upper slope is approximately 0.100 to 0.300 mA/s, and the over-suppressed state when the upper slope is above approximately 0.300 mA/s. The unsuppressed state may also be identified when the lower slope (e.g., S N) is above approximately −0.050 mA/s.

For the above conditions, the power supply may regulate voltage to the suppressor as follows:

A) A square voltage of 0.1 Hz with an oscillating amplitude of 100 mV and given offset voltage is applied to the suppressor;

B) The upper and lower slopes of the resulting current signal are calculated;

C) If the lower slope is greater than −0.050 mA/s, the status of the suppressor is automatically classified as unsuppressed, and the offset voltage is increased by a predetermined ΔV of 5 my;

D) If the lower slope is less than −0.050 mA/s, the upper slope is evaluated and based on the range where the upper slope falls, and the offset voltage is adjusted accordingly;

E) When the unsuppressed state is determined, the offset voltage is increased by 5 my;

F) When the suppressed state is determined, the offset voltage stays the same;

G) When the over-suppressed state is determined, the offset voltage is decreased by 5 my; and H) The cycle is repeated every 10 seconds.

One will appreciate that the upper slope alone (e.g., $S_P$ in FIG. 7) may be capable of identifying the unsuppressed, suppressed, and over-suppressed states of the suppressor. One will also appreciate that the lower slope alone (e.g., $S_N$ in FIG. 7) may be capable of identifying whether or not the suppressor is unsuppressed. And one will also appreciate that both slopes may be utilized together to identify the three suppressor states.

In accordance with various aspects of the present invention, it is possible to self-regulate a suppressor by ensuring that enough power is delivered to the suppressor to fully suppress the eluent and increase the accuracy of conductive detection results. And it is possible to prevent over suppression by inadvertently overpowering the suppressor, which may significantly increase suppressor lifetime.

The systems and methods described herein may provide simpler equipment configurations as desired voltages for the suppressor are determined without any feedback from the conductivity detector. In fact, the systems and methods described herein may provide desired voltages to the suppressor without knowledge of eluent concentrations and/or flow rates through the suppressor.

In the case of gradients or changing concentrations, the systems and methods described herein allow for automatically voltage changes to the suppressor. For example, as eluent concentration through the suppressor increases, a constant voltage to the suppressor would result in under-suppression of the greater eluent concentration. However, the present systems and methods allow for identifying such an unsuppressed state and automatically take corrective action.

As the present methods and systems rely solely on a measured current response of the suppressor, a power supply and/or control unit may be readily retrofit to existing IC systems.

For convenience in explanation and accurate definition in the appended claims, the terms "upper" and "lower" and similar terms are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for self-regulating a suppressor of an ion chromatography system, the method comprising:
   setting a power supply to provide an offset voltage $V_{OS}$ to the suppressor;
   activating the power supply to provide an applied voltage waveform $V_A$ to the suppressor in addition to the offset voltage $V_{OS}$;
   commencing an ion chromatography run on the ion chromatography system in which an eluent flows through the suppressor;
   measuring a current of the suppressor responsive to the offset and applied voltages $V_{OS}$ and $V_A$ during the ion chromatography run;
   determining a suppressor state of the suppressor based upon the measured current in response to the offset voltage; and
   adjusting the offset voltage $V_{OS}$ based upon the suppressor state, wherein (a) offset voltage $V_{OS}$ is increased for an unsuppressed state, and (b) offset voltage $V_{OS}$ is maintained for a suppressed state.

2. The method according to claim 1, wherein a concentration of the eluent is varied with time as the eluent flows through the suppressor, and wherein the adjusting step varies the offset voltage $V_{OS}$ over time in response to the varied concentration of the eluent with time.

3. The method according to claim 1, wherein (a) diminishing upper current indicates electrical capacitance and resistance within the suppressor, and (b) substantially constant current indicates substantially constant electrical resistance within the suppressor.

4. The method according to claim 1, wherein:
   the determining step is also based upon the measured current in response to the offset voltage, wherein (c) increasing upper current indicates an over-suppressed state; and
   the adjusting step is also based on the suppressor state wherein (c) offset voltage $V_{OS}$ is decreased for an over-suppressed state.

5. The method according to claim 4, wherein the oscillating voltage has a voltage amplitude A and a voltage frequency F, and wherein the applied voltage $V_A$ is a square-waveform voltage having a positive pulse width and a negative pulse width, and wherein (a) a current slope ($S_P$) of the positive pulse width less than a first predetermined threshold indicates an unsuppressed state, (b) a substantially neutral current slope ($S_P$) of the positive pulse width greater than the first predetermined threshold and less than a second predetermined threshold indicates a suppressed state, and (c) a current slope ($S_P$) of the positive pulse width greater than the second predetermined threshold indicates an over-suppressed state.

6. The method according to claim 5, wherein the applied voltage $V_A$ is a square waveform voltage having a positive pulse width and a negative pulse width, and the positive pulse width has a slope $S_P$, wherein (a) a slope $S_P$ of less than 0.1 mA/s indicates an unsuppressed state, (b) a slope $S_P$ of 0.1 mA/s to 0.3 mA/s indicates a suppressed state, and (c) a slope $S_P$ greater than 0.3 mA/s indicates an over-suppressed state.

7. The method according to claim 5, wherein the applied voltage $V_A$ is a square waveform voltage having a positive pulse width and a negative pulse width, and the negative pulse width has a slope $S_N$, wherein (a) a slope $S_N$ greater than −0.05 mA/s indicates an unsuppressed state, and (b) a slope $S_N$ less than −0.05 indicates a suppressed or over-suppressed state.

8. The method according to claim 1, wherein the applied voltage $V_A$ is the oscillating voltage having period T, wherein the measuring, determining, and adjusting steps are performed for each period T.

9. The method according to claim 8, wherein the adjusting step adjusts the offset voltage $V_{OS}$ by an adjusted voltage $\Delta V$ each period T.

10. The method according to claim 9, wherein the adjusted voltage $\Delta V$ is less than the applied voltage $V_A$.

11. The method according to claim 10, wherein the adjusted voltage $\Delta V$ is less than 10% of the applied voltage $V_A$.

12. The method according to claim 11, wherein the adjusted voltage $\Delta V$ is mV.

13. The method according to claim 4, wherein increasing upper current indicates increased electrical resistance and thermal effects within the suppressor.

14. The method according to claim 1, wherein (a) a diminishing upper current indicates an unsuppressed state of the eluent flowing through the suppressor, and (b) a substantially constant upper current indicates a suppressed state.

15. A system for self-regulating the separation of ionic species in a liquid sample comprising:
an ion chromatography suppressor including a liquid-sample channel, an ion-receiving channel, and an ion-exchange membrane configured to substantially block bulk liquid flow between the liquid-sample and ion-receiving channels while allowing passage of ions of one charge, positive or negative, between the channels;
first and second electrodes in electrical communication with the liquid-sample and ion-receiving channels, respectively;
a power supply for applying an electric potential to the suppressor via the first and second electrodes; and
a control unit including one or more processors and memory, wherein the one or more processors run software configured to perform the following steps:
setting the power supply to provide an offset voltage $V_{OS}$ to the suppressor;
activating the power supply to provide an applied voltage $V_A$ to the suppressor in addition to the offset voltage $V_{OS}$;
commencing an ion chromatography run in which an eluent flows through the suppressor;
measuring a current of the suppressor responsive to the offset and applied voltages $V_{OS}$ and $V_A$ during the ion chromatography run;
determining a suppressor state of the suppressor based upon the measured current in response to the offset voltage; and
adjusting the offset voltage $V_{OS}$ based upon the suppressor state, wherein (a) offset voltage $V_{OS}$ is increased for an unsuppressed state, and (b) offset voltage $V_{OS}$ is maintained for a suppressed state.

16. The system according to claim 15, the system further comprising a chromatography column upstream from the suppressor and a conductivity detector downstream from the suppressor.

17. The system according to claim 15, wherein the power supply is a dedicated power supply providing the electric potential to the suppressor.

18. The system according to claim 15, the system further comprising a power-supply module that includes the power supply and the control unit.

19. A device for self-regulating the separation of ionic species in a liquid sample comprising:
a power supply configured to apply an electric potential to an ion chromatography suppressor, the suppressor including a liquid-sample channel, an ion-receiving channel, and an ion-exchange membrane configured to substantially block bulk liquid flow between the liquid-sample and ion-receiving channels while allowing passage of ions of one charge, positive or negative, between the channels; and
a control unit including one or more processors and memory, wherein the one or more processors run software configured to perform the following steps:
setting the power supply to provide an offset voltage $V_{OS}$ to the suppressor;
activating the power supply to provide an applied voltage waveform $V_A$ to the suppressor in addition to the offset voltage $V_{OS}$;
commencing an ion chromatography run in which an eluent flows through the suppressor;
measuring a current of the suppressor responsive to the offset and applied voltages $V_{OS}$ and $V_A$ during the ion chromatography run;
determining a suppressor state of the suppressor based upon the measured current in response to the offset voltage; and
adjusting the offset voltage $V_{OS}$ based upon the suppressor state, wherein (a) offset voltage $V_{OS}$ is increased for an unsuppressed state, and (b) offset voltage $V_{OS}$ is maintained for a suppressed state.

20. The device of claim 19, wherein the power supply is a dedicated power supply providing the electric potential to the suppressor.

* * * * *